Dec. 19, 1944.  A. B. CARMICHAEL  2,365,330
APPARATUS FOR ELECTROLYTICALLY PRODUCING OXYGEN AND HYDROGEN
Filed Oct. 11, 1941  3 Sheets-Sheet 1
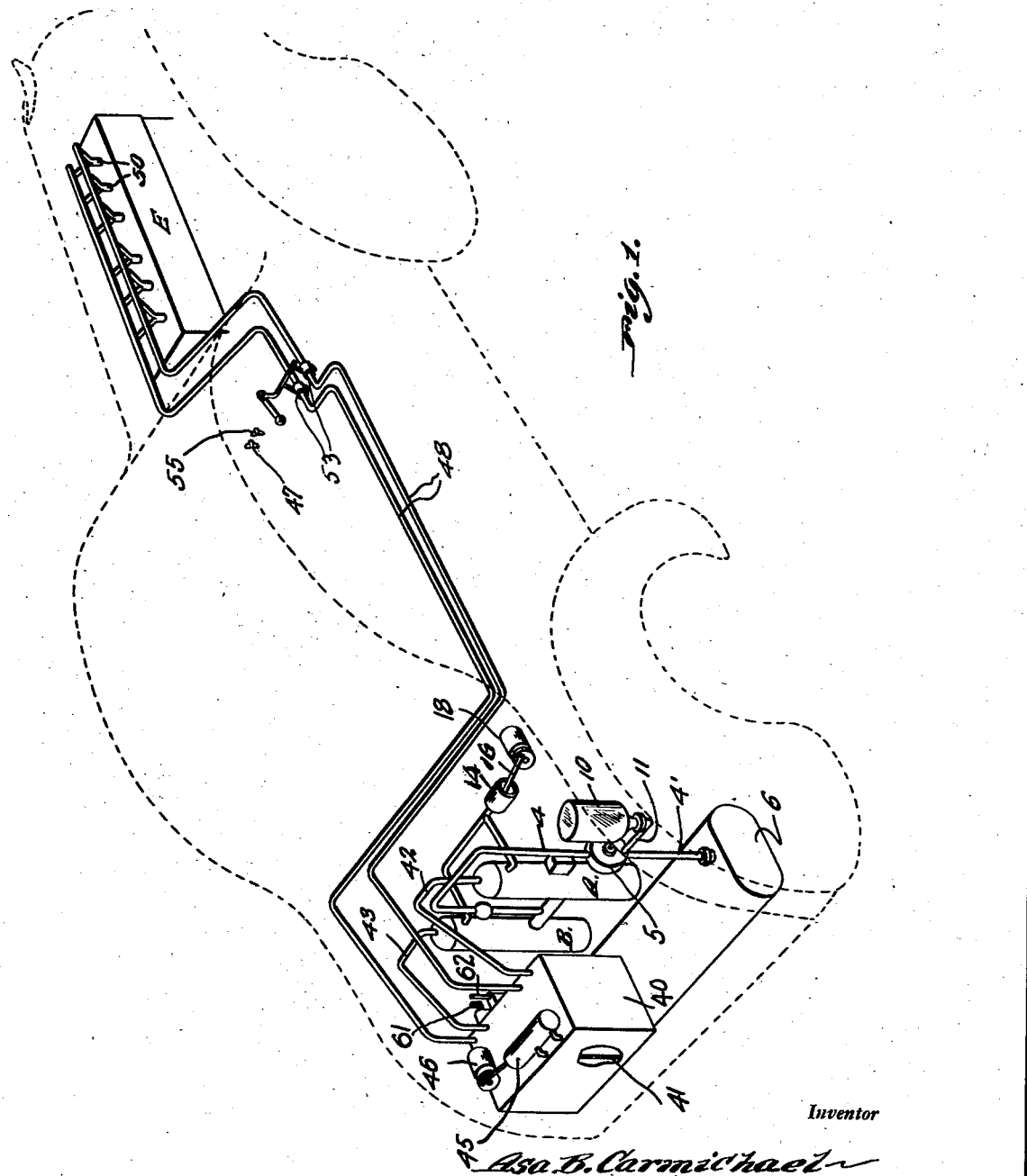
Inventor
Asa B. Carmichael
By Clarence A. O'Brien
Attorney

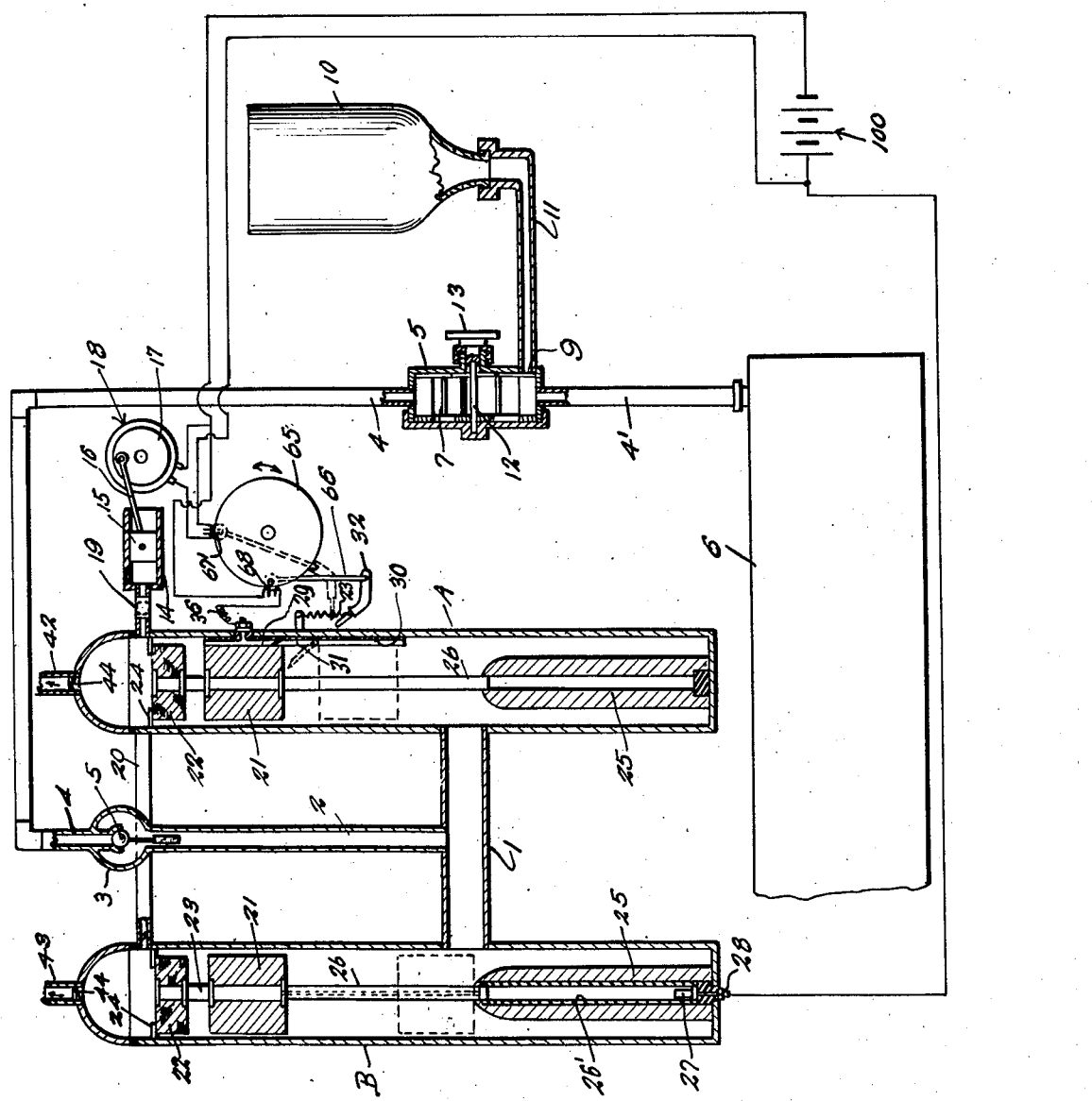

Dec. 19, 1944.  A. B. CARMICHAEL  2,365,330
APPARATUS FOR ELECTROLYTICALLY PRODUCING OXYGEN AND HYDROGEN
Filed Oct. 11, 1941   3 Sheets-Sheet 3
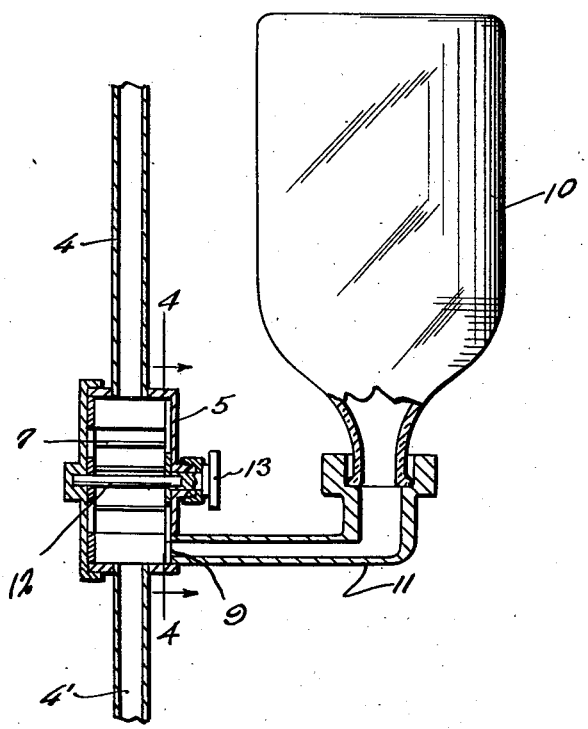
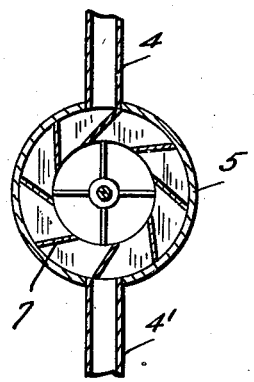
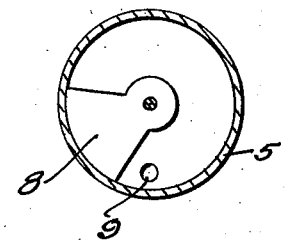
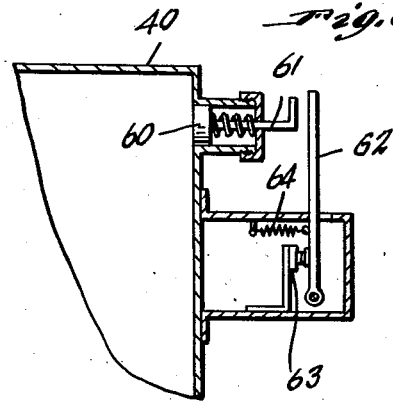
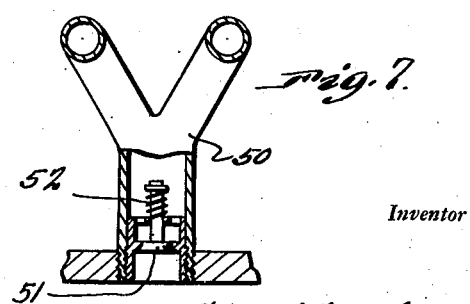
Inventor
Asa B. Carmichael
By Clarence A. O'Brien
Attorney Patented Dec. 19, 1944

2,365,330

UNITED STATES PATENT OFFICE 2,365,330

APPARATUS FOR ELECTROLYTICALLY PRODUCING OXYGEN AND HYDROGEN

Asa B. Carmichael, Tujunga, Calif.

Application October 11, 1941, Serial No. 414,681

2 Claims. (Cl. 204—275)

This invention relates to a fuel making attachment for vehicles of different kinds, aeroplanes, boats, etc., the general object of the invention being to provide means for producing oxygen and hydrogen by electrolysis and then utilizing the gases in the engine of the vehicle, boat or aircraft.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is a diagrammatic view showing the invention in use on an automobile, the automobile being shown in dotted lines.

Figure 2 is a vertical sectional view through the means for making the oxygen and hydrogen.

Figure 3 is a view of the means for introducing sulphuric acid into the water supply line for the apparatus shown in Figure 2.

Figure 4 is a section on the line 4—4 of Figure 3.

Figure 5 is a sectional view showing the water operated wheel shown in Figure 3.

Figure 6 is a sectional view through the tank for receiving the oxygen and hydrogen from the formation plant and this view showing the automatic control means for stopping the supply of gases when the tank is filled.

Figure 7 is a detail sectional view showing the means for supplying the two gases to a cylinder of the engine.

In these drawings the letter A indicates an oxygen formation cylinder and the letter B the hydrogen formation cylinder, these cylinders being connected together intermediate their ends by a cross pipe 1 from which leads a conduit 2 having a mixing chamber 3 therein. A pipe or conduit 4 extends into the mixing chamber 3 and a float control valve 5 is located in the chamber 3 and will close the lower end of the pipe 4 when the water level in the two cylinders and the connections 1 and 2 reaches a certain degree. The pipe 4 connects with a casing 5, see Figures 1, 2 and 5 and a pipe 4' leads from the casing into a tank 6 which may be the tank usually used for holding the gasoline supply of a vehicle or craft. However, in this case the tank 6 contains water.

A bladed wheel 7 is located in the casing 5, the blades of which are so arranged that as the water flows upwardly through the pipes 4 and 4' the wheel will be rotated and this causes a shutter 8 connected to a side part of the wheel to open a port 9 in a side part of the casing so that sulphuric acid from a bottle 10 will flow through the pipe 11 and the port 9 into the casing 5 where the acid will mix with the water flowing to the cylinder A and B. The wheel 17 is carried on a shaft 12 connected to a handle 13 which is provided with a pointer and graduation means so that the wheel can be adjusted to cause the shutter 8 to open the port 9 after a certain amount of water has passed from the tank 6 through the pipes 4 and 4'. Thus the amount of acid introduced into the flow of water can be regulated.

A pump cylinder 14 is provided with a piston 15 actuated by a pitman 16 from an eccentric disk 17 which is connected to the shaft of a small motor 18 supplied with current from the battery 100 of the car or otherwise. A pipe 19 connects the inlet of the pump 14 with the top of the cylinder A and a pipe 20 connects the top of the cylinder B with an intermediate part of the pipe 19 so that when the pump is in operation a vacuum will be produced in the two cylinders A and B which will cause the water to be drawn from the tank 6 through the pipes 4' and 4 into the mixing chamber 3 where the water will be mixed with the sulphuric acid and then the mixture will pass through the pipe 2 into the pipe 1 as well as into the cylinders. Of course, the acid will be mixed with the water by the wheel 7 and also as the acid water flows through the pipes 4. Electrodes 21 are located in the cylinders and a float 22 is arranged in each cylinder above the electrode and these floats are connected to the electrodes by rods 23 of non-conducting material. Stops 24 are arranged in the upper portions of the cylinders to limit upward movement of the floats. Tubular guide members 25 extend upwardly from the bottom portions of the cylinders for receiving the rods 26 depending from the electrodes 21. A sleeve of conducting material 26' is arranged in the member 25 located in the cylinder B and a contact 27 is in electrical connection with the lower end of the sleeve 26' and this contact is electrically connected by a conductor 28 with a source of supply which may be the battery 100 of the vehicle. An upper conductor plate 29 is placed in an upper portion of the cylinder A and a lower guide plate 30 is placed in said cylinder and these plates are normally bridged by a gate 31 of conducting material which has a weighted arm 32 connected therewith and located exterior of the cylinder with a spring 33 tending to hold the gate in open position and the arm 32 having moved upward, rotates the double contact switch 65 clockwise through the pitman 66 to close the circuit 67 to the motor 18 when the gate is open. A conductor 36 connects the plate 29 to the source of supply 100 through the switch contact 68.

Thus when both cylinders are substantially full with the mixture of water and sulphuric acid and current is turned on through the conductors 28 and 36 the latter through switch contact 68 electricity will be supplied to the electrodes 21 whereby oxygen will be produced in the chamber or cylinder A and hydrogen in the cylinder B. As the water level drops during the electrolysis action the floats, of course, will move downwardly as will the electrodes 21 and after the electrode in the cylinder A passes the gate 31 the flow of electricity to the electrode 21 in cylinder A through means of the plate 29 is stopped because gate 31 opens and thus the electrolysis is stopped and the gate moves to the dotted line position shown in Figure 2 so that the circuit 67 to the motor 18 is completed, through the switch contact 67' and this causes the pumps 14 and 15 to pump more water from the tank into the cylinders A and B and thus restore the water level so that the gas producing action will start over again, because when electrode 21 rises with the inflowing water the gate 31 is closed, the arm 32 descends and through pitman 66 rotates switch 65 counter-clockwise to close contact 68.

A tank 40 is suitably supported in the vehicle or craft and contains a partition 41 which divides the tank into two chambers, the small chamber being connected by a tube 42 to the top of the oxygen cylinder and the larger chamber being connected by a tube 43 at the top of the hydrogen cylinder and these tubes contain the valves 44, see Figure 2, which close downwardly so as to prevent the suction created by the pumps 14 and 15 for drawing fluid from the tank. However, these valves will open upwardly to permit the gases from the cylinders to flow into the two chambers of the tank. A pump 45 is in communication with the two chambers of the tank 40 and the piston of the pump is operated by a motor 46, the circuit of which is controlled by a switch 47 adjacent the operator of the vehicle so that by closing this switch the pump 45 will draw air out of the chambers of the tank 40 so that oxygen and hydrogen can enter the chambers. Pipes or tubes 48 lead from the chambers of the tank 40 to Y-shaped inlet tubes 50 in communication with the cylinders of the engine E and each Y-shaped member contains an inwardly opening valve 51 normally held on its seat by a spring 52. Thus the oxygen and hydrogen gases are not mixed until they are about ready to enter the cylinders of the engine and the valves 51 are open by the suction of the engine. The flow of gases through the tubes 48 to the cylinders of the engine are controlled by valves 53 controlled by a manually operated member 54 adjacent the driver seat. A switch 55 is located adjacent the driver seat for opening and closing the circuit to the electrodes.

Thus it will be seen that when the operator of the vehicle or craft wishes to start the same it is simply necessary for him to first close the switch 47 so as to cause the pump 45 to pump air out of the chambers of the tank 40 and then the switch is turned off, then the switch 55 is closed which connects the conductors 28 and 36 the latter through switch contact 68 with the storage battery or other source of supply. The motor 18 will not have its circuit closed until the gate swings to open position as shown in dotted lines in Figure 2. The production of the hydrogen and oxygen begins when gate 31 is closed and the gases pass from the cylinders into the chambers of the tank 40 and from these chambers through the pipes 48 into the cylinders of the engine.

As will be seen this invention eliminates the carburetor necessary for internal combustion motors and all the exhaust valves need to do is to exhaust sulphur trioxide and possibly some water. There will be no carbon in the exhaust so that there will be no smudging of the engine cylinders. Any water in the gases entering the cylinders will be turned into steam which will help the gases to actuate the pistons and, of course, the running of the engine by the oxygen and hydrogen is greatly cheaper.

I also provide means for breaking the circuit to the electrodes 21 when a certain amount of hydrogen and oxygen are introduced into the tank 40. As shown in Figure 6 such means includes a spring-actuated piston 60 in the top of the tank which is pressed outwardly when the pressure of the gases reaches a certain degree and when this happens the outer end of the rod 61 bears against the switch arm 62 to open the switch 63 which controls the circuit to the electrodes. Thus the production of the gases will stop and when the pressure lowers in the tank a spring 64 will return the arm 62 to switch closing position and then the apparatus starts up again.

The parts are suitably insulated to cause the current to pass from the contact 27 to the electrode 21 in cylinder B then through the water to the other electrode 21 and then to the source through the plate 29 and circuit 36 when the parts are in the position shown in Figure 2. Also, vents can be provided in the member 25 to prevent the dropping of fluid as the electrodes move downwardly and the oxygen conveying tube 48 should be one-half the diameter of the hydrogen tube because the best explosive mixture of the gases is two parts of hydrogen to one of oxygen.

Also, any suitable material can be used instead of the sulphuric acid.

Having described the invention, what is claimed as new is:

1. In apparatus of the character described, a pair of upright cylinders arranged side by side, a cross conduit intermediate the ends of the cylinders establishing communication between the same, means including an intermittently operating pump for supplying water to said cylinders, a source of sulphuric acid supply having a discharge pipe, means to introduce sulphuric acid from said pipe into the water as the water passes to said cylinders including a wheel actuated by flow of the water and having thereon a shutter for controlling the discharge from said pipe, a pair of vertically movable electrodes in said cylinders for generating oxygen in one cylinder and hydrogen in the other, a pair of floats above the electrodes, respectively, connected thereto to maintain the same submerged and cause the electrodes to rise and fall in correspondence with variations in the level of water in the cylinders, an electric circuit in which the electrodes are interposed, and a circuit maker and breaker operative under control of one electrode to break said circuit when the water in said cylinders falls to a predetermined level.

2. In apparatus of the class described, a pair of upright cylinders arranged side by side, a cross conduit intermediate the ends of the cylinders establishing communication between the same, a source of water supply, a conduit extending from said source to said cylinders, means to cause water to flow through said conduit to said cylinders intermittently, means actuated by flow of water through said conduit for introducing sulphuric acid into the water as it passes to said cylinders, a pair of vertically movable electrodes in said cylinders for generating oxygen in one cylinder and hydrogen in the other, a pair of floats above said electrodes, respectively, connected thereto to maintain the same submerged and cause the electrodes to rise and fall in correspondence with variations in the level of the water in the cylinders, an electric circuit in which said electrodes are interposed, and means to make and break said circuit under control of one of the electrodes comprising a plate of conductive material in one cylinder, a second guide plate in said cylinder spaced from the first-mentioned plate, a bridge piece of conductive material extending between said plates and held in bridging relation thereto by the electrode in said one cylinder when the water in said one cylinder stands at high level, said bridge piece being constructed and arranged to be released by said electrodes when the water in said one cylinder falls to a low level, and means for moving the bridge piece out of bridging relation when released by said electrode.

ASA B. CARMICHAEL.